United States Patent [19]

Henry

[11] Patent Number: 4,816,210
[45] Date of Patent: Mar. 28, 1989

[54] PASSIVE FILTERED CONTAINMENT VENT

[75] Inventor: Robert E. Henry, Naperville, Ill.

[73] Assignee: Westinghouse Electric Corp., Pittsburgh, Pa.

[21] Appl. No.: 81,088

[22] Filed: Aug. 3, 1987

[51] Int. Cl.[4] ................................................. G21C 9/00
[52] U.S. Cl. ...................... 376/309; 376/281; 376/284; 376/310; 137/74
[58] Field of Search ............... 376/308, 309, 310, 284, 376/281; 55/256, 310; 137/72, 74

[56] References Cited

U.S. PATENT DOCUMENTS

| | | | |
|---|---|---|---|
| 2,717,032 | 9/1955 | Dupin | 137/74 |
| 2,942,615 | 6/1960 | Dayton. | |
| 3,105,028 | 9/1963 | Long | 376/310 |
| 3,248,539 | 4/1966 | Strandt et al. | 137/74 |
| 4,610,840 | 9/1986 | Leach | 376/310 |
| 4,612,959 | 9/1986 | Costello | 137/74 |

Primary Examiner—Deborah L. Kyle
Assistant Examiner—Richard Klein
Attorney, Agent, or Firm—D. C. Abeles

[57] ABSTRACT

Apparatus for the controlled venting of gases from the containment housing of a chemical or nuclear reactor. The vent path is configured as a manometer filled with a low melting point metal. Gases passing through the manometer are exhausted to a tank of scrubbing solution where toxic materials are removed prior to venting the gases from the containment housing.

15 Claims, 2 Drawing Sheets

PASSIVE FILTERED CONTAINMENT VENT

BACKGROUND OF THE INVENTION

1. Field of the Invention:

The present invention relates generally to safety systems for chemical and nuclear reactors and more particularly to a passive filtered venting system.

2. Description of the Prior Art:

The nuclear industry has given considerable attention to the problem of degraded core and core melt accidents in nuclear reactors. One aspect of that problem is that of containment failure due to long term overpressure when fission products are released from the core to the containment atmosphere. The Industry Degraded Core Rulemaking (IDCOR) Program, Sponsored by the Nuclear Industry in July 1983 published its Technical Report 19.1 entitled Alternate Containment Concepts which contains an evaluation of various containment concepts for potential mitigation or delay of containment failure during accidents beyond the design basis. Generally, that study concluded that the reduction of the risk of inadvertantly releasing material to the atmosphere is higher with the vent-filter systems that have more components. Conversely, however, such systems are more prone to component failure and operator error.

While the removal of heat from the containment is essentially an active process, the venting of the containment is preferred to be passive in that there is no power requirement, minimal test and maintenance requirements, high reliability and simple operation. The most common form of passive vent is the well known rupture disc which simply gives way at a preselected design pressure. A rupture disc will reliably open at the design pressure, it will not close when the containment pressure drops below that which requires venting.

SUMMARY OF THE INVENTION

Briefly, the present invention provides a vent path configured as one or more manometers containing a low melting point metal. When a design temperature and pressure occur the metal melts thus providing a path for the exhaust of toxic gases to a tank of scrubbing solution.

DESCRIPTION OF PREFERRED EMBODIMENTS

Figure 1:
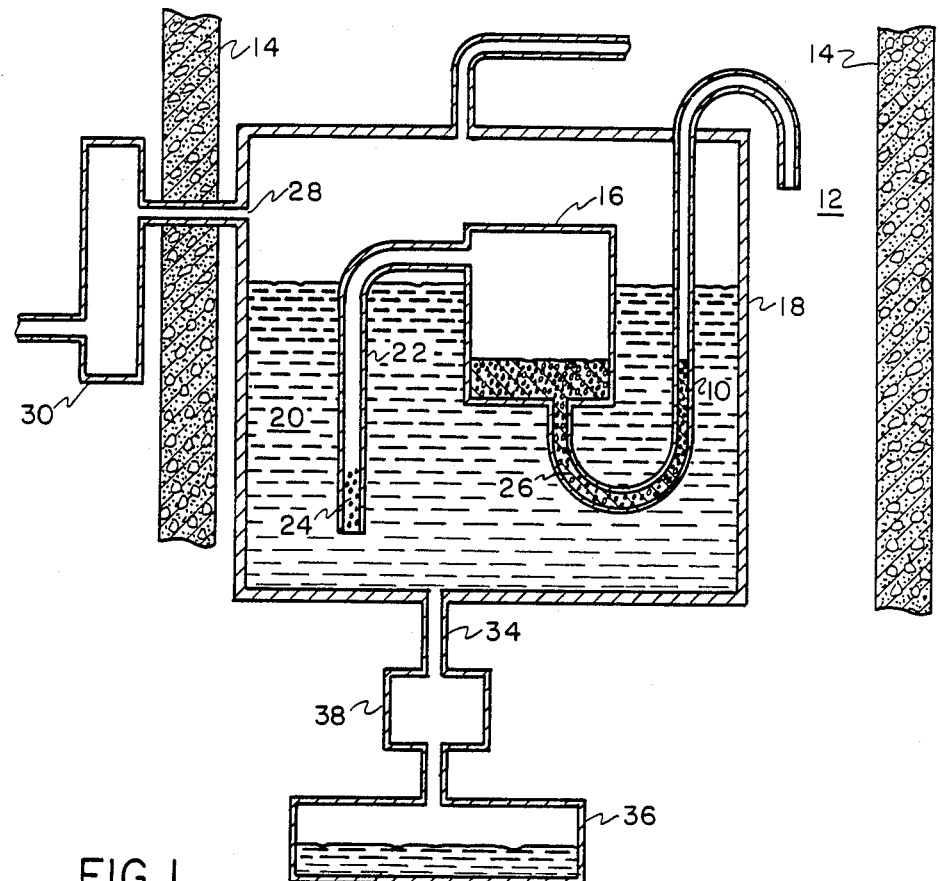
FIG. 1 is a schematic cross-section view of a passive, filtered containment vent in accordance with the present invention.

Turning now to FIG. 1 there is illustrated in a schematic vertical cross-section view a passive filtered containment vent embodying the principles of the present invention. The vent path is configured as a manometer 10 extending from the interior 12 of the containment 14 to an upper plenum 16 disposed in a tank 18 of scrubbing solution 20. The upper plenum 16 exhausts into the scrubbing solution 20 via pipe 22 having a multiplicity of small holes 24 in its lower end.

The manometer 10 and upper plenum 16 contain a quantity of a low melting point metal 26 such as Wood's metal. Wood's metal is a mixture of tin, lead, antimony and cadmium and is commercially available from American Scientific Products Industrial Division of Morgan Park, Ill.

The design basis pressure of the containment 14 is maintained by the Wood's metal manometer 10 in two respects. First, the melting temperature of Wood's metal 26 is seventy degrees Centigrade. Therefore under normal operation as well as design basis accident conditions such as the rupture of a large reactor coolant pipe, during which the containment 14 is pressurized for only a short period of time, the Wood's metal 26 would remain at the temperature of the scrubbing solution 20 and not achieve the melting point. Even if the containment heat removal equipment such as containment sprays and/or safety grade fan coolers (not shown), which would have removed steam from the containment, would not be available to cool the containment interior 12, the Wood's metal 26 would not reach melting point for hours. Thus, even with a large break loss of coolant accident wherein containment overpressure does not become critical the vent would remain closed.

Secondly, since Wood's metal 26 has a density of approximately seven thousand kilograms per cubic meter, the static head of Wood's metal, even when molten would withstand a design basis pressure difference within the containment 14. By way of illustration a Wood's metal column of 5.1 meters would withstand a pressure difference of 50.8 psig before a flow path through the manometer 10 would be established.

As the molten Wood's metal 26 is depressed in the manometer 10, containment gases would be passed into the upper plenum 16 and from there through the submerged pipe 22 into the scrubbing solution 20. The holes 24 in the pipe 22 would emit the condensable and noncondensable gases, as well as any entrained fission products into the scrubbing solution 20 where they are scrubbed as they pass upwardly through the pool. The evolving gases would contain essentially only noble gases which may be exhausted through the containment wall via exhaust port 28. If further filtering were desired the exhaust port could be coupled to the plant charcoal filter(s) 30 before being exhausted to the environment.

Should the containment 14 pressure subsequently be decreased as a result of containment spray activation or fan cooler operation, the Wood's metal head difference across the manometer 10 would establish an automatic seal at a reliable closing pressure for a given vent configuration.

The relatively large volume of scrubbing solution 20 (e.g. water) for removal of volatile fission products also functions as a long term heat sink for the trapped materials. A scrubbing solution supply line to the tank 18 may be provided to replace that solution which is vaporized over a period of time due to the energy absorbed from the trapped fission products. A drain 34 to a containment sump 36 controlled by a valve 38 is also provided for long term retention of the deposited materials.

If means for measuring the static head of the scrubbing solution 20 in the tank 18 is provided, the amount of entrapped fission material in the tank may be determined and indicate the nature of precautions which should be considered by the operators in dealing with the waste solution. Specifically, the rate of change of the static head further allows the operators to estimate the energy deposited in the scrubbing solution and thus fractions of entrapped iodine and cesium.

Figure 2:
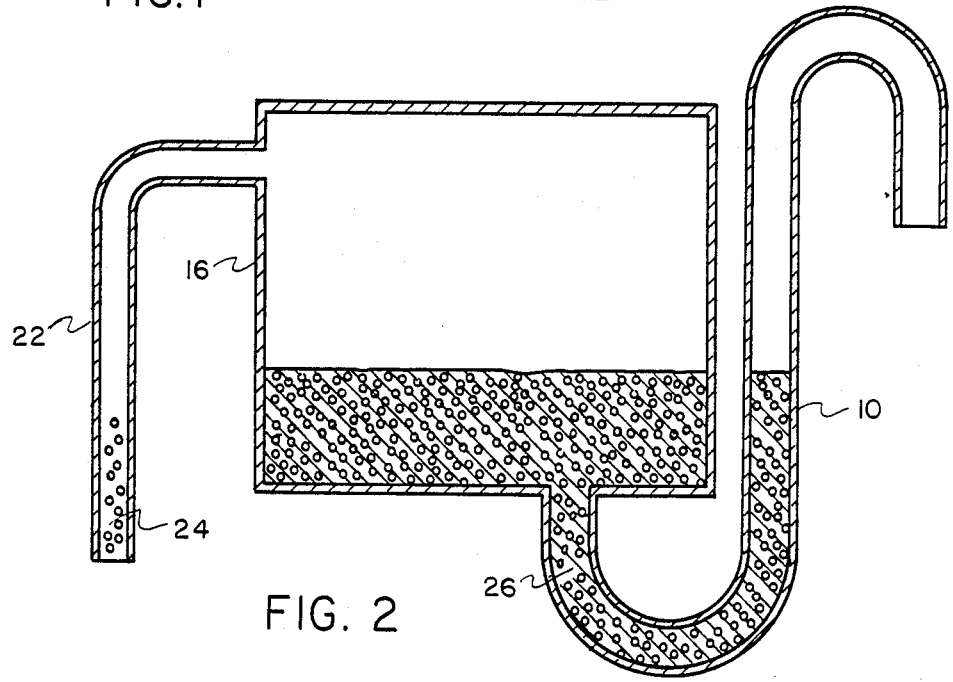
FIG. 2 is a cross-section view of an alternative embodiment of the manometer portion of the apparatus of FIG. 1.
Figure 3:
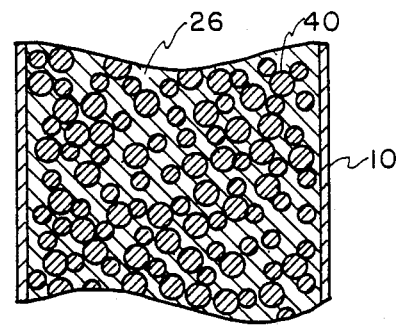
FIG. 3 is a transverse cross-section view of the manometer of FIG. 2 along section line 3—3.

FIG. 2 illustrates the manometer portion of a passive filtered containment vent as described with reference to FIG. 1 but wherein relatively low cost steel shot 40 is mixed with the low melting point metal 26. By replacing a large portion of the low melting point metal 26 a significant cost reduction is provided while maintaining a reliable vent path around the steel shot 40. FIG. 3 is a cross-section view of the manometer of FIG. 2 wherein like elements are identified by like reference characters and illustrating the steel shot 40 entrained or fluidized in the low melting point metal 26. The manometer of FIG. 2 otherwise operates in the same fashion as that shown in FIG. 1.

Figure 4:
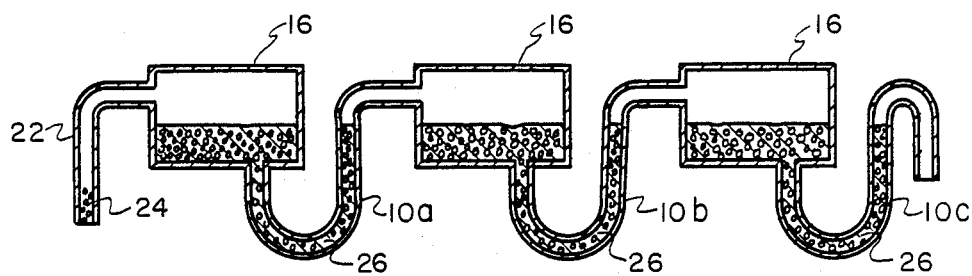
FIG. 4 is a cross-section view of another alternative embodiment manometer useful in the practice of the invention.

For some applications such as nuclear power plant containment vents the required pressure differential for vent actuation would require a manometer of considerable height; e.g. six meters. This amount of space in many existing plant arrangements is not available. FIG. 4 illustrates an arrangement of multiple manometers 10a, 10b, 10c coupled in series to obtain the required pressure differential without the excessive height. In all other respects the apparatus of FIG. 4 operates in the same manner as that of FIGS. 1 and 2 and like elements are identified with like reference characters.

In addition to providing a highly reliable opening and closing pressure the apparatus of the present invention is comparatively compact and simple in its operation. It is passive and requires no valves or rupture discs for its activation and thus may be mounted within the containment. Both installation and maintenance are thereby simplified and the barrier of the containment is maintained within the containment.

The embodiments of the invention described herein are particularly useful in the nuclear power plant environment, however, they may also be used to manage venting and scrubbing of toxic materials from a variety of chemical or other facilities housing exothermic reactions. The particular low melting point metal, component sizes and scrubbing solution chemistry would be selected to suit the specific application.

From the foregoing description it will be seen that the application has provided a new and improved passive filtered vent whereby the shortcomings of the prior art are efficiently overcome. Since certain changes in the above-described construction will occur to those skilled in the art without departure from the scope of the invention, it is intended that all matter set forth in the preceding description or shown in the appended drawings shall be interpreted as illustrative and not in a limiting sense.

Having described what is new and novel and desired to secure by Letters Patent, what is claimed is:

1. An improved containment vessel for a reactor, said containment vessel including imperforate containment walls defining a fully enclosed housing for the elements of said reactor, at least one of said walls including portions defining at least one vent opening therein, and a pressure relief system including at least one container for a supply of scrubbing liquid for reaction with vapor phase products present in said containment vessel, said scrubbing liquid in use subdividing said scrubbing liquid container into subsurface and headspace portions, respectively, an outlet conduit extending from said scrubbing liquid container headspace through said vent opening in said housing wall for directing said vapor phase products to the exterior of said housing after said products have passed through said scrubbing liquid, and at least one temperature and pressure responsive check valve assembly for controlling the passage of said vapor phase products from the interior of said housing into said scrubbing liquid container, and thereafter to the exterior of said housing, said check valve assembly comprising, in combination, at least one valve chamber subdivided into subsurface and headspace portions by a given level of a control material, said control material being responsive by reversible change of state from solid to liquid as the temperature in said valve chamber varies between lower and higher temperatures, respectively, a valve outlet conduit extending from said valve chamber headspace to a subsurface portion of said scrubbing liquid container, said valve assembly further including a valve inlet conduit extending between said interior of said housing and said subsurface portion of said valve chamber, said valve inlet conduit also having at least one portion lying above the level of the surface of said control material, said scrubbing liquid container being disposed in heat exchange relation with said vapor phase products in said housing interior, and said valve chamber being in heat exchange relation with said scrubbing liquid, whereby, when said control material is liquified by temperature rise, and the pressure in said vessel interior exceeds a pressure imposed by the static head of said control material and said scrubbing liquid, vapor phase products will pass from said containment vessel interior through said valve chamber and to said containment vessel exterior by way of said scrubbing liquid container.

2. A containment vessel as defined in claim 1 wherein said control material is a metallic material having a melting point below 100° C.

3. A containment vessel as defined in claim 1 wherein said heat exchange relation between said valve chamber and said scrubbing liquid container is achieved by positioning at least a part of said valve chamber within a subsurface portion of said scrubbing liquid container.

4. A containment vessel as defined in claim 1 wherein said valve outlet conduit includes an outlet portion adjacent its lower end, said outlet portion including a plurality of small diameter outlets adapted to act as diffusers in use to insure intimate mixing of said vapor phase products with said scrubbing liquid.

5. A containment vessel as defined in claim 1 wherein said valve inlet conduit is in the form of a U-tube having its lowermost portion lying substantially below the bottom wall portion of said valve chamber.

6. A containment vessel as defined in claim 1 wherein said control material is a two-phase material, one of said phases being a material having said reversible change of state at a first, relatively lower temperature, and the remainder of said material being solid pellets of a much higher melting point material, said higher melting point material thereby serving as a filler for said lower melting material.

7. A containment vessel as defined in claim 1 wherein said at least one valve assembly comprises an assembly wherein said at least one valve chamber comprises a plurality of valve chambers, one of said chambers including said valve inlet conduit and another of such chambers including said valve outlet conduit, said chambers having disposed therebetween and being connected by a series conduit extending from the headspace of one of said chambers to the subsurface portion of another of said chambers, whereby, in use, vapor phase products pass through all of the headspace areas of all of said valve chambers in passing from said containment vessel interior to said exterior thereof.

8. In a reactor containment vessel which includes imperforate containment walls defining a fully enclosed housing for the elements of said reactor, at least one of said walls including portions defining at least one vent opening therein, and a pressure relief system including at least one container for a supply of scrubbing liquid for reaction with vapor phase products present in said containment vessel, with said scrubbing liquid in use subdividing said scrubbing liquid container into subsurface and headspace portions, respectively, and an outlet conduit extending from said scrubbing liquid container headspace through said vent opening in said housing wall for directing said vapor phase products to the exterior of said housing after said products have passed through said scrubbing liquid, the improvement comprising at least one temperature and pressure responsive check valve assembly for controlling the passage of said vapor phase products from the interior of said housing into said scrubbing liquid container, and thereafter to the exterior of said housing, said check valve assembly comprising, in combination, at least one valve chamber subdivided into subsurface and headspace portions by a given level of a control material, said control material being responsive by reversible change of state from solid to liquid as the temperature in said valve chamber varies between lower and higher temperatures, respectively, a valve outlet conduit extending from said valve chamber headspace to a subsurface portion of said scrubbing liquid container, said valve assembly further including a valve inlet conduit extending between said interior of said housing and said subsurface portion of said valve chamber, said valve inlet conduit also having at least one portion lying above the level of the surface of said control material, said scrubbing liquid container being disposed in heat exchange relation with said vapor phase products in said housing interior, and said valve chamber being in heat exchange relation with said scrubbing liquid, whereby, when said control material is liquified by temperature rise, and the pressure in said vessel interior exceeds a pressure imposed by the static head of said control material and said scrubbing liquid, vapor phase products will pass from said containment vessel interior through said valve chamber and to said containment vessel exterior by way of said scrubbing liquid container.

9. A combination as defined in claim 8 wherein said control material is a metallic material having a melting point below 100° C.

10. A combination as defined in claim 8 wherein said heat exchange relation between said valve chamber and said scrubbing liquid container is achieved by positioning at least a part of said valve chamber within a subsurface portion of said scrubbing liquid container.

11. A combination as defined in claim 8 wherein said valve outlet conduit includes an outlet portion adjacent its lower end, said outlet portion including a plurality of samll diameter outlets adapted to act as diffusers in use to insure intimate mixing of said vapor phase products with said scrubbing liquid.

12. A combination as defined in claim 8 wherein said valve inlet conduit is in the form of a U-tube having its lowermost portion lying substantially below the bottom wall portion of said valve chambers.

13. A temperature and pressure responsive check valve assembly for controlling the passage of said vapor phase products from the interior of a reactor containment vessel housing into an associated scrubbing liquid container for venting to the exterior of said housing, said check valve assembly comprising, in combination, at least one valve chamber subdivided into subsurface and headspace portions by a given level of a control material, said control material being responsive by reversible change of state from solid to liquid as the temperature in said valve chamber varies between lower and higher temperatures, respectively, a valve outlet conduit extending in use from said valve chamber headspace to a subsurface portion of said associated scrubbing liquid container, said valve assembly further including a valve inlet conduit extending in use between the interior of said housing and said subsurface portion of said valve chamber, said valve inlet conduit also having at least one portion lying above the level of the surface of said control material, said valve chamber being disposable in heat exchange relation with the scrubbing liquid in said container, whereby, when said control material is liquified by temperature rise, and the pressure in said vessel interior exceeds a pressure imposed by the static head of said control material, vapor phase products will pass through said valve inlet to said valve chamber and from said valve chamber through said valve outlet conduit.

14. A valve assembly as defined in claim 13 wherein said control material is a metallic material having a melting point below 100° C.

15. A valve assembly as defined in claim 13 wherein said control material is a two-phase material, one of said phases being a material having said reversible change of state at a first, relatively lower temperature, and the remainder of said material being solid pellets of a much higher melting point material, said higher melting point material thereby serving as a filler for said lower melting material.

* * * * *